July 28, 1931.  W. L. MORRIS  1,816,022
GREASE FEEDER
Original Filed Aug. 7, 1916
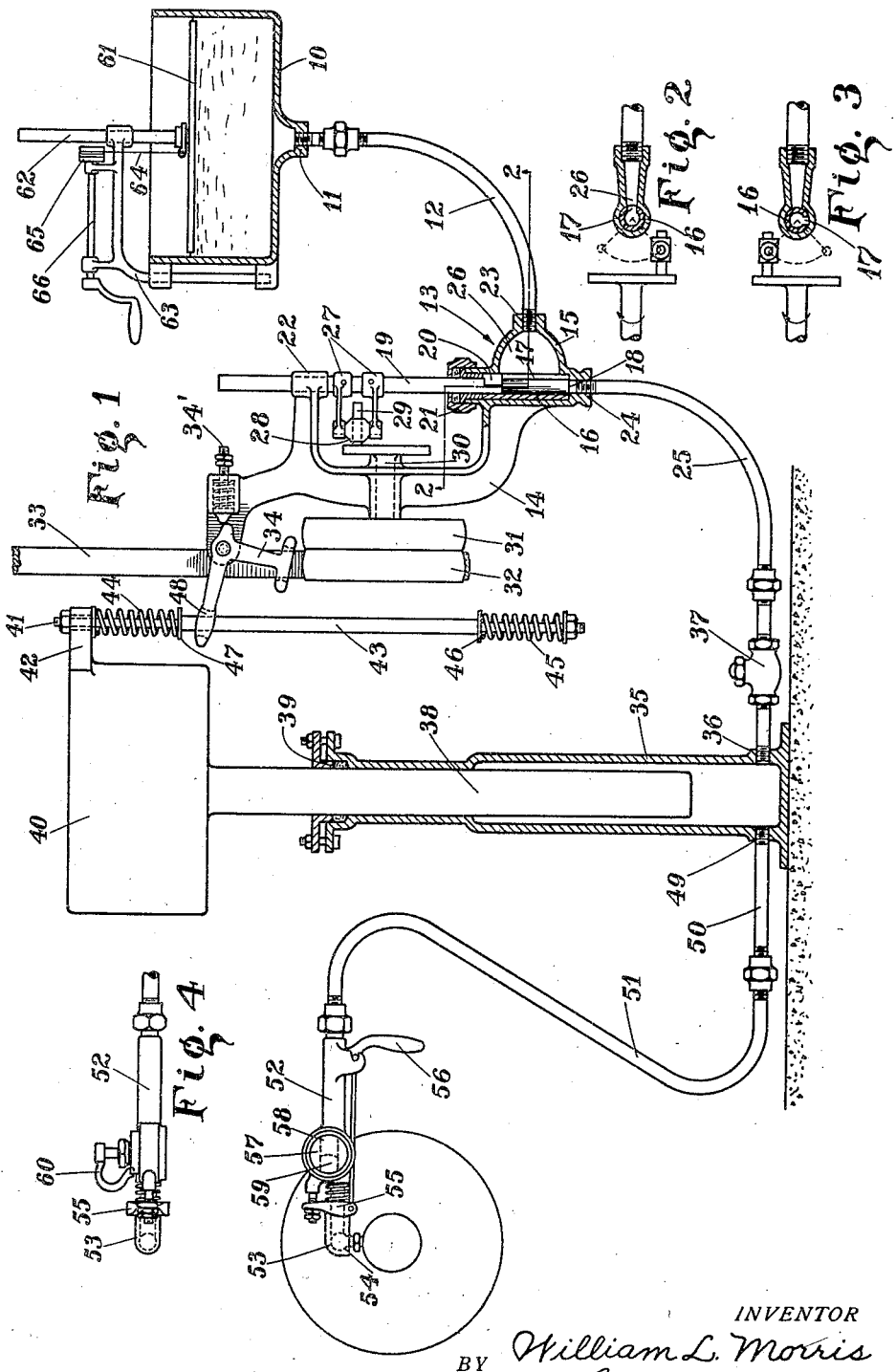
INVENTOR
William L. Morris
BY
Clinton S. Janes
ATTORNEY Patented July 28, 1931

1,816,022

UNITED STATES PATENT OFFICE

WILLIAM L. MORRIS, OF CHICAGO, ILLINOIS, ASSIGNOR TO BENDIX AVIATION CORPORATION, OF CHICAGO, ILLINOIS, A CORPORATION OF DELAWARE

GREASE FEEDER

Original application filed August 7, 1916, Serial No. 113,653. Divided and this application filed January 31, 1930. Serial No. 424,999.

This invention relates to a grease feeder and more particularly to a power operated grease feeding mechanism capable of maintaining a constant supply of lubricant under pressure and dispensing the same under the control of the operator.

This application is a division of my previous application, Serial Number 113,653 filed August 7, 1916.

Such power grease feeding mechanism heretofore proposed has been subject to various disadvantages among which are the necessity of storing a large quantity of grease under pressure in a container designed to withstand such pressure and of shutting down the apparatus to open such container when the supply of grease therein is exhausted.

One object of the present invention is to provide a novel lubricant feeding mechanism adapted to handle and dispense expeditiously large quantities of lubricant under pressure.

Another object is the provision of such a lubricant feeder in which the pressure on the lubricant is built up and maintained automatically from a source of power.

A further object of the invention is the provision of a novel lubricant feeder which includes a reservoir of lubricant under pressure and means for automatically maintaining a supply of lubricant therein.

Another object is to provide such a lubricant feeder which includes a normally stationary reservoir for lubricant under pressure and portable metering and injecting means connected thereto by a flexible conduit.

A further object is to provide a power grease feeder having a comparatively small reservoir for lubricant under pressure and means for automatically maintaining a supply of lubricant therein from a lubricant container which is under atmospheric pressure.

Further objects and advantages will be apparent to those skilled in the art from the following description taken in connection with the accompanying drawings in which:

Fig. 1 is an elevation partly in section of one form of the present invention;

Fig. 2 is a detail partly in section of the operating means for the lubricant pump taken substantially on the line 2—2 of Fig. 1;

Fig. 3 is a similar detail of the pump operating mechanism in another position of operation; and Fig. 4 is a plan view of the lubricant dispensing tool.

Referring first to Fig. 1 of the drawings, an open container 10 is provided of any suitable form but preferably being large in diameter and shallow to facilitate loading with the lubricant to be dispensed. The outlet 11 of the container 10 is connected by means of a suitable conduit 12 with a pump mechanism indicated generally by numeral 13.

The pump 13 comprises a frame 14 having a pump chamber 15 attached thereto or integrally formed therewith. A sleeve valve 16 is freely journaled in suitable bearings in said chamber and is provided with an inlet slot 17 in its side and an outlet opening 18 in one end thereof. A pump plunger 19 is adapted to extend within the sleeve valve 16 and is provided with a keying projection 20 which is adapted to slide in the slot 17 and spline the sleeve 16 to said plunger for rotation therewith. A packing nut 21 is preferably provided for preventing the escape of lubricant around the plunger 19 and a bearing 22 is formed on the frame 14 to keep the plunger 19 in alignment with the bearings in the pump chamber 15. The pump chamber is provided with an inlet opening 23 adapted to receive the conduit 12 and an outlet opening 24 adapted to receive a conduit 25.

A pump chamber 15, as shown in Figs. 1, 2, and 3, is formed with a narrow elongated opening 26 which is substantially co-extensive with the slot 17 of sleeve 16 when the latter is rotated into registry therewith.

Oscillation and reciprocation of the plunger 19 are secured by means of any suitable power driving mechanism. In the form shown, a pair of arms 27 are rigidly mounted on the plunger 19 and are universally connected at 28 to a wrist pin 29 carried by a shaft 30 provided with a fast pulley 31 and a loose pulley 32. A belt 33 constantly driven from any suitable source of power is adapted to rotate one or the other of said pulleys according to the position of a belt shifter 34.

A reservoir 35 adapted to contain lubricant under pressure is provided with an inlet 36 adapted to receive the end of conduit 25, a check valve 37 being inserted in said conduit to prevent the escape of lubricant from the reservoir back into the pump. Plunger 38 is mounted to slide within the reservoir 35, suitable packing 39 being provided at the top of the reservoir to prevent the escape of lubricant. A weight member 40 is imposed on said plunger 38 or formed integrally therewith, the size of the weight being chosen to determine the pressure desired within the reservoir 35.

In order to regulate the operation of the pump to maintain a supply of lubricant in the reservoir, a connection is established between the plunger 38 and the belt shifter 34. This connection may take the form of a rod 41 mounted in a lug 42 extending from the weight 40 and carrying a sleeve 43 slidably mounted thereon and normally held in a central position by means of springs 44 and 45. Sleeve 43 is provided at its ends with flanges 46 and 47, adapted to cooperate with the arm 48 of the belt shifter 34 to move the belt 33 from one pulley to the other.

Alternatively, the part 43 may be simply an enlarged portion of rod 41 terminating in stop shoulders for collars 46 and 47 to limit the expansion of springs 44 and 45.

A spring detent 34' is preferably provided to prevent movement of belt shifter 34 until spring 44 or 45 has been considerably compressed. This ensures full travel of the belt shifter 34 the moment it forces the detent out of its way.

Reservoir 35 is provided with one or more outlets 49 adapted to receive connections 50 for flexible conduits 51 which are adapted to convey the grease under pressure to manually operated dispensing devices 52.

The dispensing device as illustrated in Figs. 1 and 4 comprises a tool having a nozzle 53 adapted to be clamped tightly on a spherical fitting 54 of the element to be lubricated as by means of a lever 55 actuated by a handle 56. In order to control the admission of lubricant to the fitting 54, the tool is provided with a rotary cylinder 57 having a passage 58 therethrough forming a part of the grease passage through the tool 52 and being larger in diameter than the remaining portions of the passage in said tool. A plug 59 is slidably mounted in the passage 58 forming a metering valve for the grease which is operative when rotary cylinder 57 is rotated, to admit a charge of grease to the fitting 54 corresponding to the space of passage 58 which is unoccupied by the plunger 59. A handle 60 is provided for the cylinder 57 whereby the cylinder may be rotated manually to cause the injection of a charge of grease.

In order to prevent air from piercing the grease in the container 10 during the operation of the pump 13, a follower in the form of a disk 61 is provided. Disk 61 is adapted to fit loosely within the container 10 and rest on the surface of the grease, extending laterally with respect to the outlet 11 so as to make the distance from the free surface of the grease to the outlet substantially greater than the shortest distance from the outlet to the upper level of the grease. The disk 61 is preferably carried by a vertical shaft 62 slidably mounted in a swinging davit 63. A cable 64 may be attached to the disk 61 for facilitating raising said disk as by means of a drum 65 on which the cable may be wound by means of a crank shaft 66.

When it is desired to operate the device, the follower disk 61 is swung clear of the container 10 and the container is filled with grease. The wide shallow shape of the container 10 facilitates the filling of the container 10 with grease free from air.

The pump 13 is thereupon put in operation by moving the belt 33 on the fast pulley 31 whereupon plunger 19 is reciprocated and oscillated. The oscillation of plunger 19 is so designed with respect to its reciprocation that the slot 17 of sleeve 16 is aligned with the opening 26 during the up-stroke of plunger 19 whereby grease is admitted to the cylinder 16, and the slot 17 is rotated to trap the grease within the cylinder 16 and cause it to be forcibly ejected therefrom into the conduit 25 during the down-stroke of the plunger 19. The grease passes through the check valve 37 into reservoir 35 causing the plunger 38 to be raised against the resistance of weight 40 until flange 46 of sleeve 43 engages the belt shifter arm 48 and moves the belt 33 to the idle pulley 32. The reservoir 35 is thus charged with air-free grease under the desired pressure determined by weight 40. When the grease is dispensed therefrom, the plunger 38 will descend until the flange 47 of sleeve 43 moves the arm 48 of belt shifter 34 downwardly to shift the belt 33 to the fast pulley 31 thus again starting the grease pump 13.

In operating the dispensing device, the nozzle 53 of the tool is placed over a fitting 54 of a member to be lubricated and the handle 56 swung to clamp the nozzle to the fitting. The cylinder 57 is thereupon rotated by means of the handle 60 through a half revolution whereupon the grease propels the plunger 59 across the passage 58 forcing the grease ahead of it into the fitting 54. When the plug 59 reaches the end of passage 58 it cuts off the flow of grease so that the tool may be removed and applied to another fitting whereupon the operation may be repeated.

Although but one embodiment of the invention has been illustrated and described in detail, it will be understood that this structure is not exclusive and further embodiments will now suggest themselves to those skilled in the art and certain parts may be combined, altered or omitted and changes made in the arrangement and mode of operation thereof without departing from the spirit of the invention.

Reference will therefore be had to the claims hereto appended for a definition of the scope of the invention.

What is claimed is:

1. In a lubricant feeder, a lubricant reservoir, a gravity operated weight for maintaining a supply of lubricant under pressure therein, a portable injecting device adapted to be attached to an element to be lubricated, and a flexible conduit connecting said device with the lubricant reservoir.

2. In a lubricant feeder, a lubricant reservoir, means for automatically maintaining a continuous supply of lubricant under constant pressure in said reservoir, a portable injecting device adapted to be attached to an element to be lubricated and manually operable for injecting a quantity of lubricant into said element, and a flexible conduit connecting said device with said lubricant reservoir.

3. In a lubricant feeder, a lubricant reservoir, means for automatically maintaining a supply of lubricant under pressure therein, a portable injecting and metering device adapted to be attached to an element to be lubricated and manually operable to inject a measured quantity of lubricant into said element, and a flexible conduit connecting said device with the lubricant reservoir.

4. In a lubricant feeder a closed lubricant reservoir, an open lubricant container, means for withdrawing air-free lubricant from the container and forcing the same under pressure into said reservoir, a dispensing device, and a conduit connecting said reservoir to the dispensing device.

5. In a lubricant feeder a closed lubricant reservoir, a lubricant container under atmospheric pressure, automatic means for withdrawing air-free lubricant from the container and forcing the same under pressure into said reservoir, a portable dispensing and metering device adapted for universal connection to an element to be lubricated, and a flexible conduit connecting said reservoir to the dispensing device.

6. In a lubricant feeder a source of lubricant supply under pressure including a closed lubricant reservoir, a lubricant container under atmospheric pressure, power means for withdrawing air-free lubricant from the container and forcing the same into the reservoir, and means for automatically controlling said power means to maintain a supply of lubricant under pressure in said reservoir.

7. In a grease feeder, a source of grease supply under pressure including a closed grease reservoir, an open grease container, power means for sucking grease from the container and forcing it into said reservoir, means for automatically controlling said power means to maintain a supply of grease under pressure in said reservoir, and means for preventing air from piercing the grease in the container and entering the suction opening.

8. In a grease feeder a source of grease supply under pressure including a closed grease reservoir, an open grease container, power means for sucking the grease from the container and forcing it into said reservoir and a loose follower member adapted to rest on the free surface of the grease in the container and prevent air from piercing the grease and entering the suction opening.

9. In a grease feeder a source of grease supply under pressure including a closed grease reservoir, an open grease container, means for sucking the grease from the container and forcing it into said reservoir, means for automatically controlling said power means to maintain a supply of lubricant under pressure in said reservoir and a loose follower member adapted to rest on the free surface of the grease in the container and prevent air from piercing the grease and entering the suction opening.

10. A power lubricant feeder including a container under atmospheric pressure, a closed lubricant reservoir, means for applying pressure to the lubricant in said reservoir, and means under the control of said pressure means for withdrawing lubricant from said container and forcing the same into said reservoir.

11. A power lubricant feeder including a container under atmospheric pressure, a closed lubricant reservoir, means for applying a substantially constant pressure to the lubricant in said reservoir, means for withdrawing lubricant from said container and forcing the same into said reservoir, and controlling means for said withdrawing means operated by said pressure means to maintain a supply of lubricant under pressure in said reservoir.

12. In a lubricant feeder, a normally stationary lubricant container for a portable dispensing device adapted for lubricant tight connection to any one of a plurality of elements to be lubricated, a flexible conduit for conveying lubricant from the container to the dispensing device and automatic pumping means between the container and the dispensing device for delivering lubricant under substantially constant predetermined pressure to said dispensing device.

13. An apparatus for lubricating mechanisms comprising, a lubricant container, means for effecting displacement of the lubricant from said container, a conduit for conveying lubricant from said container to a place of delivery, a coupling member connected to said conduit remote from said container, and means intermediate said receptacle and said coupling member for imposing pressure on lubricant supplied to said coupling member.

14. A lubricating apparatus for servicing lubricant receiving fittings comprising, a lubricant receptacle, a conduit leading from said receptacle to a place of lubricant disposal, means connected with said conduit at said place for connecting said conduit to a fitting, means for causing a flow of lubricant from said receptacle into said conduit, and means in said conduit between said receptacle and the fitting connecting means for placing the lubricant in said connecting means under pressure.

15. In combination, a lubricant reservoir, a conduit for conveying lubricant to a place of disposal, means for pumping lubricant from said reservoir into said conduit, a dispensing nozzle and a manually operable valve connected with said conduit at said place of disposal, and means operative upon the dispensing of a predetermined amount of lubricant from said nozzle for initiating operation of said pumping means.

16. In combination, a lubricant reservoir, a conduit for conveying lubricant to a place of disposal, means for forcing lubricant from said reservoir into said conduit, manually operable means connected with said conduit for dispensing lubricant therefrom, means for actuating said forcing means, and means operative upon the dispensation of a quantity of lubricant from said conduit for starting said actuating means to actuate said forcing means.

17. In combination, a lubricant reservoir, a conduit for conveying lubricant to a place of disposal, means for withdrawing lubricant from said reservoir and forcing the same through said conduit, normally inoperative means for operating said withdrawing means, means attached to said conduit at said place for dispensing lubricant supplied through said conduit, and means operated by dispensation of a quantity of lubricant from said conduit for rendering operative said normally inoperative means.

18. In combination, a lubricant reservoir, a conduit for conveying lubricant to a place of disposal, means for withdrawing lubricant from said reservoir and forcing the same through said conduit, means for operating said withdrawing means, means attached to said conduit at said place for dispensing lubricant supplied through said conduit, and means operated by the accumulation of a quantity of lubricant in said conduit for stopping said operating means.

19. In a grease feeder, a chamber for grease under relatively low pressure, a chamber of lesser cross-sectional area for grease under relatively high pressure, means for pumping grease from the low into the high pressure chamber, a dispensing nozzle connected with said high pressure chamber, and means for forcing grease from said high pressure chamber under relatively high pressure to said dispensing nozzle.

20. In a lubricant feeder a chamber for lubricant under relatively low pressure, a second chamber of lesser cross-sectional area for lubricant under relatively high pressure, said chambers having intercommunication, means for forcing lubricant from the first said chamber into the second said chamber said second chamber having a lubricant outlet, and means for ejecting lubricant from the second chamber through said outlet under relatively high pressure.

21. In a lubricant feeder a chamber for lubricant under relatively low pressure, a second chamber of lesser cross-sectional area for lubricant under relatively high pressure, said chambers having intercommunication and second chamber having a lubricant outlet therefrom, means for forcing lubricant from the first chamber into the second chamber, and means operative simultaneously with said forcing means for ejecting lubricant from the second chamber through said outlet under relatively high pressure.

22. In a lubricant feeder, a chamber for lubricant under relatively low pressure, a second chamber of lesser cross-sectional area for lubricant under relatively high pressure, said chambers having intercommunication and said second chamber having a lubricant outlet therefrom, means for forcing lubricant from said first chamber into the second chamber, means for ejecting lubricant from the second chamber through said outlet under relatively high pressure, and a check valve between said chambers whereby to prevent return of lubricant to the first said chamber.

23. In a lubricant feeder a chamber for lubricant under relatively low pressure, a second chamber of lesser cross-sectional area for lubricant under relatively high pressure, said chambers having intercommunication, means for forcing lubricant from the first said chamber into the second said chamber said second chamber having a lubricant outlet, means for ejecting lubricant from the second chamber through said outlet under relatively high pressure, a conduit connected with said second chamber outlet, and a dispensing device including a manually operable valve connected with said conduit.

24. In a lubricant feeder, a chamber for lubricant under relatively low pressure, a second chamber of lesser cross-sectional area for lubricant under relatively high pressure, said chamber having intercommunication and said second chamber having a lubricant outlet therefrom means for forcing lubricant from said first chamber into the second chamber, means for ejecting lubricant from the second chamber through said outlet under relatively high pressure, a check valve between said chambers whereby to prevent return of lubricant to the first said chamber, a conduit connected with said second chamber outlet, and a dispensing device including a manually operable discharge valve connected with said conduit.

25. A lubricant dispensing apparatus comprising a lubricant storage chamber, a lubricant receiving chamber, means for pumping lubricant from the storage chamber into the receiving chamber, means for placing lubricant in the receiving chamber under pressure, and means for controlling the discharge of lubricant from the receiving chamber, said means for placing the lubricant under pressure comprising a plunger in the receiving chamber and means normally urging the plunger toward one extreme position against lubricant pumped into the receiving chamber so that the urging means cooperates with the plunger to place the lubricant under pressure.

26. A lubricant dispensing apparatus comprising a lubricant storage chamber, a lubricant receiving chamber having an outlet, continuously effective pressure creating means in the receiving chamber, means for forcing lubricant from the storage chamber into the receiving chamber against the action of the pressure creating means so that the latter will place the lubricant under high pressure and tend to eject the lubricant from the receiving chamber through its outlet, and means for controlling the discharge of lubricant from the outlet.

27. A lubricant dispensing apparatus comprising a lubricant storage chamber, a lubricant receiving chamber having an outlet, means for forcing lubricant from the storage chamber into the receiving chamber, means for maintaining a yielding resistance to the introduction of lubricant into the receiving chamber and operating to set up pressure upon the lubricant forced into the latter so as to tend to eject the lubricant from the receiving chamber through its outlet, and means for controlling the discharge of lubricant from the outlet.

28. A lubricant dispensing apparatus comprising a lubricant storage chamber having an outlet, a lubricant receiving chamber having an inlet and an outlet, a one-way valve controlling the inlet and opening toward the receiving chamber, means for withdrawing lubricant from the storage chamber through its outlet and forcing the lubricant through the inlet of the receiving chamber into the latter, means for maintaining a yielding resistance to the admission of lubricant into the receiving chamber and operating to set up pressure upon the lubricant forced into the latter so as to tend to eject the lubricant from the receiving chamber through its outlet, and means for controlling the discharge of lubricant from the outlet.

29. A lubricant dispensing apparatus comprising a lubricant storage chamber having an outlet, a lubricant receiving chamber having an inlet and an outlet, a one-way valve controlling the inlet and opening toward the receiving chamber, a plunger in the receiving chamber, means for urging the plunger toward one extreme position to cause the plunger to eject lubricant in advance thereof from the receiving chamber through the outlet of the latter, means for successively withdrawing charges of lubricant from the storage chamber through the outlet of the latter and forcing the charges into the receiving chamber through the inlet of the latter to cause the lubricant to force the plunger towards another extreme position against the action of said urging means and thereby place the lubricant in the receiving chamber under pressure for ejection of the lubricant from the outlet of the receiving chamber, and means for controlling the discharge of lubricant from the outlet of the receiving chamber.

30. In a lubricant feeding system, a stationary lubricant storage receptacle, a conduit for conveying lubricant from said receptacle to different places of lubricant disposal, said conduit including a flexible portion, means attached to said conduit remote from said receptacle for connecting the conduit to devices to be lubricated, means connected with said conduit between said attachment means and said receptacle for placing the lubricant in the conduit between the same and said attachment means under pressure, cyclic means in said conduit for feeding a predetermined amount of lubricant per cycle from one part of said conduit to said attaching means, and means for operating said cyclic means.

In testimony whereof, I have hereunto signed my name.

WILLIAM L. MORRIS.